United States Patent [19]

Hall

[11] 4,245,898
[45] Jan. 20, 1981

[54] MICROFICHE READER

[75] Inventor: Peter J. Hall, Barrie, Canada

[73] Assignee: Microvue Products, Inc., Barrie, Canada

[21] Appl. No.: 835,956

[22] Filed: Sep. 23, 1977

Related U.S. Application Data

[62] Division of Ser. No. 777,772, Mar. 15, 1977, Pat. No. 4,140,376.

[51] Int. Cl.$^2$ ............................................. G03B 23/08
[52] U.S. Cl. .................................................. 353/27 R
[58] Field of Search ...................................... 353/27 R

[56] References Cited

U.S. PATENT DOCUMENTS

| | | | |
|---|---|---|---|
| 3,836,242 | 9/1974 | Kluver et al. | 353/27 R |
| 3,907,416 | 9/1975 | Frank et al. | 353/27 R |

FOREIGN PATENT DOCUMENTS

| | | | |
|---|---|---|---|
| 867758 | 2/1953 | Fed. Rep. of Germany | 353/27 R |
| 2434569 | 1/1976 | Fed. Rep. of Germany | 353/27 R |

*Primary Examiner*—Steven L. Stephan
*Attorney, Agent, or Firm*—Fetherstonhaugh & Co.

[57] ABSTRACT

A microfiche reader according to the present invention includes a housing consisting of a hood portion and a base portion, a screen located within the hood portion and visible through the front end of the hood, a combined microfiche carriage and index holder, a lens assembly and a projection system. The combined microfiche carriage and index holder serves to accurately locate the microfiche with respect to the index grid. By reason of the fact that there is no relative movement between the index grid and the microfiche in use, it is always possible to accurately locate the microfiche with respect to the projection system by reference to the index grid. The index grid is illuminated by an index illuminating lens carried by the housing. The illuminating lens is located in a fixed relationship with respect to the projection path which again contributes to the facility with which the microfiche may be accurately located in the projection path. The lens assembly includes a support plate mounted above the microfiche carriage and a slide member mounted in the support plate and a pair of lens members mounted in the slide members so that either one may be located in the projection path as required. The projection system includes a demountable modular unit which may be easily mounted in and removed from the housing. A prefocussed lamp is mounted on the modular unit and the position of the prefocussed lamp with respect to the modular unit may be adjusted so as to vary the length of the illuminating path between the prefocussed lamp and the condenser means whereby the optical system may be adjusted to accommodate objective lenses having different characteristics. The projection system consists of a prefocussed lamp which projects a beam of light onto a cold mirror which reflects the beam of light through an optical condenser which in turn directs the beam of light through the micromirror is mounted in the housing and reflects the beam of light emitted from the objective lens to a viewing screen mounted in the housing. The viewing screen consists of a unitary body of molded plastics material having an image receiving surface formed with a concave spherical curvature. The image receiving surface may be plated with a suitable coating to form an image reflecting coating thereon.

1 Claim, 10 Drawing Figures

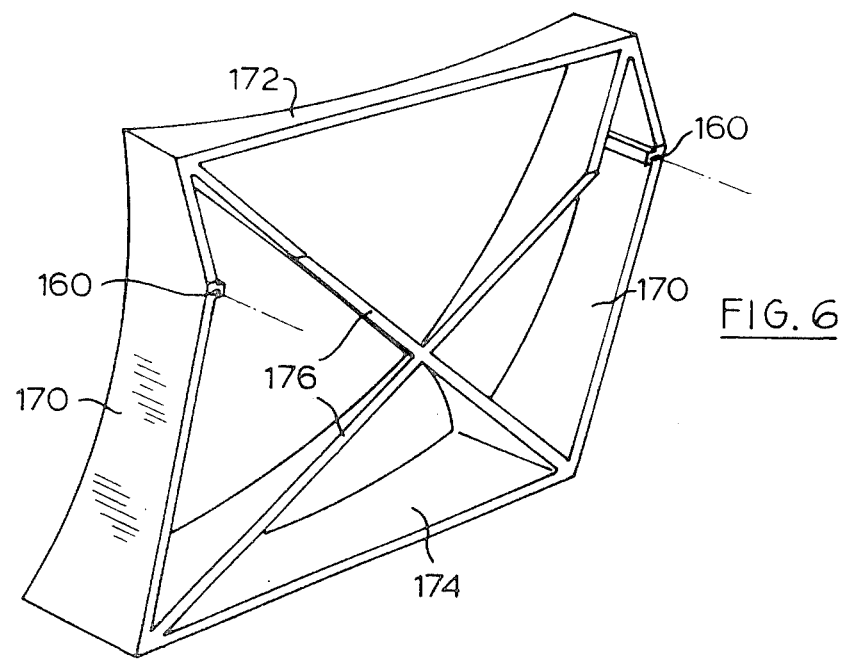
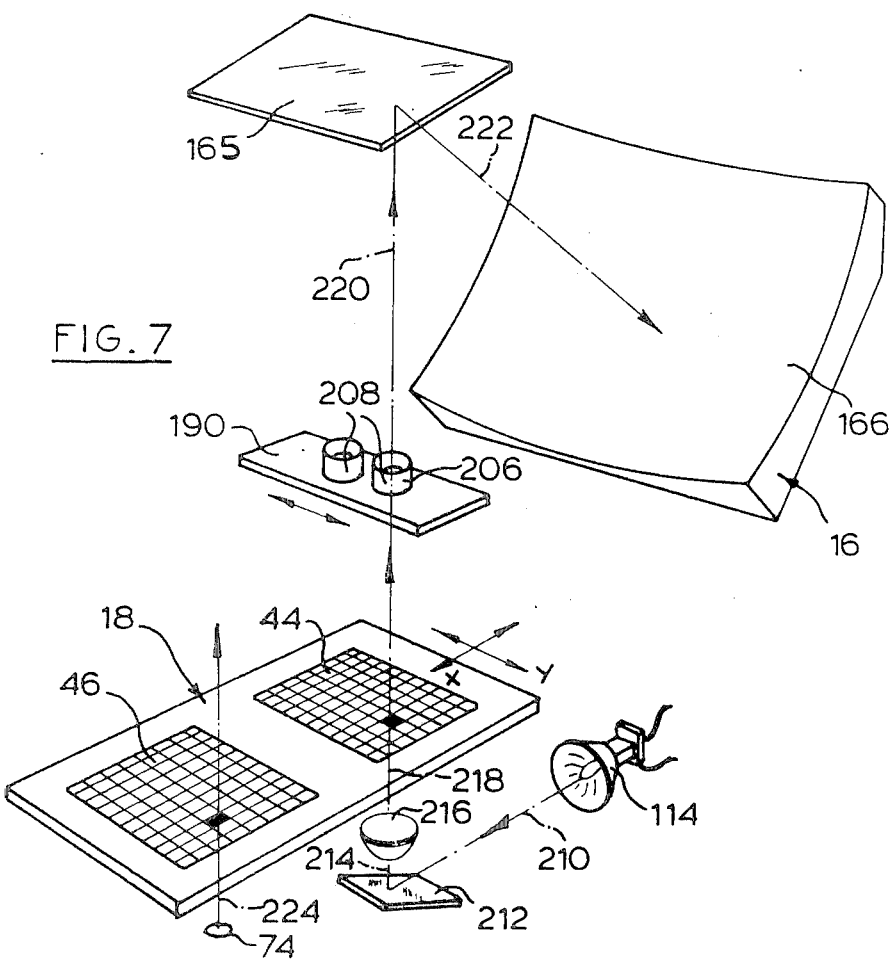

MICROFICHE READER

This is a division of application Ser. No. 777,772, filed Mar. 15, 1977, now U.S. Pat. No. 4,140,376.

This invention relates to improvements in a microfiche reader. In particular, this invention relates to improvements in a front projection type of microfiche reader.

PRIOR ART

In the microfiche readers which are presently available, a microfiche is located in a movable holder for movement with respect to the illuminating path of the projection system and a corresponding grid pattern is located in a stationary position with respect to the microfiche housing. The microfiche holder has an indexing finger projecting outwardly therefrom to overlie the indexing grid. The indexing finger may be located at any position with respect to the indexing grid to locate the corresponding portion of the microfiche in the projection path. Because the microfiche holder and, therefore, the microfiche is movable relative to the indexing grid, the microfiche may be slightly misaligned with respect to the grid making the location of a specific area of the microfiche difficult at times. In addition, the clearances between the relatively moving components of the microfiche holder and indexing grid are such that difficulties can be experienced in obtaining correct alignment of the microfiche.

I have overcome the above difficulties by reason of the fact that the indexing grid and microfiche are mounted in a unitary microfiche carriage and index holder so that no relative movement occurs between the indexing grid and the microfiche when the apparatus is in use.

Considerable difficulty has also been experienced in attempting to provide an undercarriage support system for the microfiche carriage which will adequately support the carriage for movement with respect to the projection path of the reader. This difficulty has been overcome by providing an undercarriage which has V-shaped support rails and V-shaped wheels cooperating with one another and rails on the support platform of the microfiche reader to provide a minimum backlash in the system in response to movement of the microfiche carriage.

In a microfiche reader it is important to ensure that the microfiche may be located in and removed from the microfiche carriage as easily as possible. I have achieved this desirable result by providing an upper glass flat which is automatically raised as the microfiche carriage is moved to a predetermined position forwardly of the platform of the reader to provide access to the microfiche for removal.

The servicing of the projection system of a microfiche reader is generally limited to a requirement that the illuminating light may be readily replaced. This is achieved in accordance with one aspect of the present invention by reason of the fact that the lamp is mounted in a modular unit which may be removed from the reader housing.

In many instances it is desirable to be able to change the objective lens of a microfiche reader so that the reader may be used for a variety of purposes. When the objective lens is changed in the known readers, considerable adjustment of the optical system is required. This difficulty is overcome by one aspect of the microfiche reader of the present invention which provides a prefocussed lamp which is mounted to be adjustably movable towards and away from the condenser lens of the projection system whereby the projection system may be adjusted to accommodate objective lenses having different characteristics by the movement of the position of the prefocussed lamp with respect to the condenser lens. Preferably the prefocussed lamp is mounted to be adjustably movable with respect to the modular unit which is removable from the main housing of the reader.

To adjust the magnification of the projected image in known microfiche readers., the objective lens is removed and replaced by another lens. This adjustment requires a knowledge of the structure of the microfiche reader assembly and can create difficulties for operators not familiar with the structure. This difficulty has been overcome according to one aspect of the microfiche reader described herein by mounting a pair of objective lenses in a slide member which is slidably mounted in a support plate above the microfiche carriage, the lenses being releasably secured in the illuminating path of the projector as required in use.

The majority of microfiche readers presently in use have a projection system which requires a power-driven fan in order to provide adequate cooling. Because of the very substantial amount of heat generated by the conventional optical system, it has been necessary to make the housings relatively large and to provide a powerful fan-driven cooling system. The fan-driven cooling system is noisy and creates a further source of service difficulties. These difficulties are overcome by one aspect of the apparatus described herein which provides an optical system and venting system and housing construction which permits the microfiche reader to operate without the use of a forced-air cooling system.

Considerable difficulty has also been experienced in providing a screen for a microfiche reader which has adequate reflective characteristics to function effectively as a screen in a front projection system. The screen of the microfiche reader according to one aspect of the present invention overcomes this difficulty and is formed from a unitary body of molded plastics material which has an image receiving surface formed with a concave spherical curvature and which is coated with a layer of an image reflecting material.

SUMMARY OF INVENTION

According to one aspect of the present invention, there is provided in a microfiche reader of the type having a housing, an image projection system including projector means and a screen for receiving a projected image and an illuminating path extending from the projector means to the screen, the improvement of a combination microfiche carriage and index holder which comprises a frame, a first window opening through said frame, means for locating a microfiche in a predetermined position with respect to said first window for the projection of light therethrough, a second window opening through said frame, a transparent index grid mounted in said second window in a predetermined position with respect to said second window for the projection of light therethrough, index illuminating means underlying said second window and located in a fixed relationship with respect to a portion of the illuminating path which projects through said first window opening, said frame being mounted for planar movement with respect to said housing to locate any required area of the grid in the beam of light emanating from the index illuminating means and thereby to locate the corresponding areas of the microfiche in the illuminating path of the projector for projection onto the screen.

According to a further aspect of the present invention, there is provided in a microfiche reader of the type having a housing, an image projection system including projector means and a screen for receiving a projected image and an illuminating path extending from the projector means to the screen, a microfiche carriage having an upper glass flat arranged to be disposed above a microfiche in the carriage, the improvement of a lens assembly which comprises a support plate mounted above said microfiche carriage, passage means opening through said support plate in alignment with the illuminating path of said projector, a slide member mounted in said support plate for movement relative thereto, a pair of lens passages opening through said slide member, a lens holder mounted in each of said lens passages, a lens member releasably mounted in each of said lens holders, said carriage means being slidable relative to said support plate to locate one or other of said lens members in said illuminating path of said projector, and releasable lock means for releasably locking either of said lens members in said illuminating path in use.

According to a further aspect of the present invention, there is provided a microfiche reader of the type having a housing, a viewing screen located within said housing and a projection system for projecting an illuminating beam of light along an illuminating path, said illuminating beam being directed through a condenser lens, a microfiche and an objective lens arranged in series and onto said screen, the improvement wherein said projection system includes a demountable modular unit which comprises a frame removably mounted in an operative position in said housing, mirror means mounted in said frame in a fixed position with respect to said frame, said mirror means being located in said illuminating path when said frame is in said operative position, a prefocussed lamp mounted in said frame for movement towards and away from said mirror means to vary the length of the illuminating path between the prefocussed lamp and the condenser means whereby the optical system may be adjusted to accommodate objective lenses having different characteristics.

According to a further aspect of the present invention, there is provided a microfiche reader of the front projection type having a housing, a microfiche carrier mounted in said housing and a projection system for projecting an illuminated image from a microfiche, the improvement wherein said projection system comprises a prefocussed lamp mounted in said housing providing a source of a beam of light, a cold mirror mounted in said housing in the path of the beam of light emitted from said prefocussed lamp for reflecting said beam, an optical condenser mounted in said housing in the path of the beam of light reflected by said cold mirror, said optical condenser directing the beam of light through the microfiche carrier, an objective lens mounted in said housing for receiving the beam of light transmitted through said microfiche carrier, a first surface mirror mounted in said housing in the path of the beam of light emitted from said objective lens, a viewing screen mounted in said housing for receiving the illuminated beam of light reflected from said first surface mirror, said prefocussed lamp being adjustable towards and away from said optical condenser whereby the projection system may be adjusted to accommodate objective lenses having different characteristics.

According to a further aspect of the present invention, there is provided a microfiche viewer having a housing, a screen mounted in said housing and a front projection system for projecting images from a microfiche onto a screen, the improvement wherein said screen comprises a unitary body of molded plastics material having an image receiving surface formed with a concave spherical curvature, said image receiving surface being coated with a layer of image reflecting material.

According to a further aspect of the present invention, there is provided a microfiche viewer having a housing, wherein the screen has an upper edge and a lower edge, and a pair of side edges, said side edges converging with respect to one another whereby the screen has an image receiving surface which is narrower at said upper edge than it is at said lower edge to conform to the configuration of the projected image.

The invention will be more clearly understood after reference to the following detailed specification read in conjunction with the drawings wherein, FIG. 1 is a pictorial front view of a microfiche reader according to an embodiment of the present invention;

FIG. 6 is a pictorial back view of the screen;

FIG. 7 is a diagrammatic illustration of the projection system and indexing system of the microfiche reader;

Figure 1:
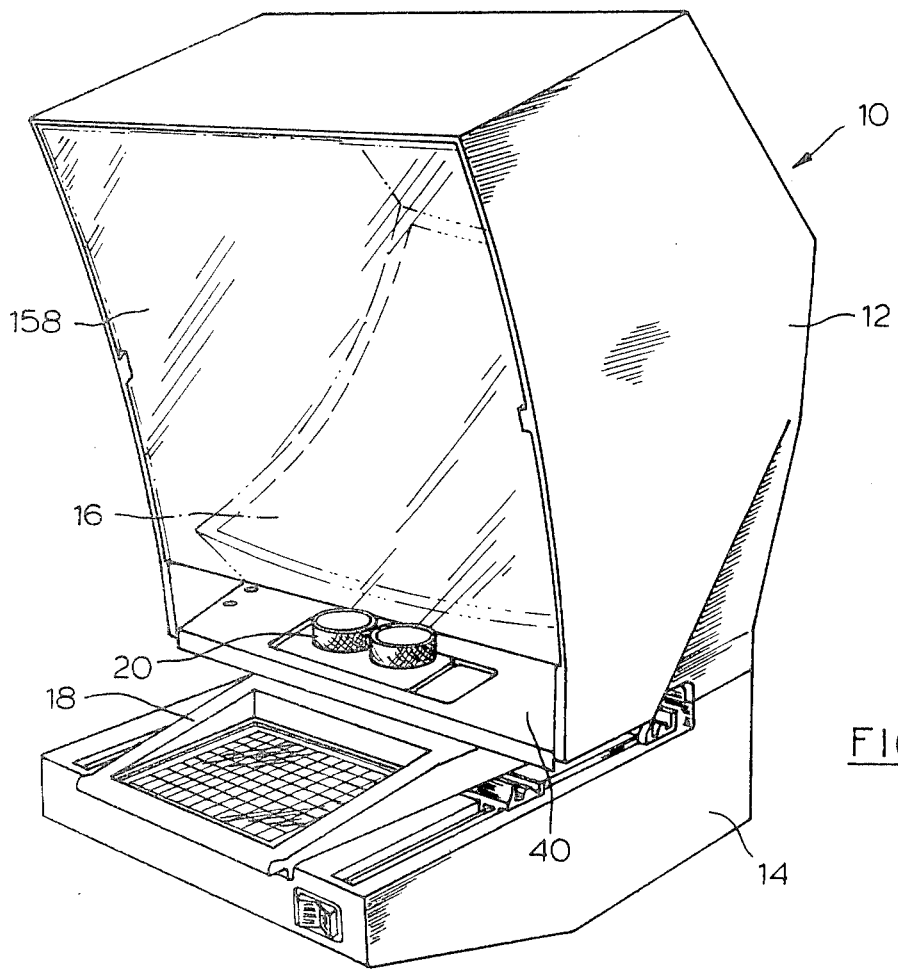

A microfiche reader according to an embodiment of the present invention is illustrated in FIG. 1 of the drawings. In FIG. 1 of the drawings, the reference numeral 10 refers generally to the microfiche reader housing which consists of a hood portion 12 and a base portion 14. A screen 16 is located within the hood 12 and is visible through the front end of the hood. A combined microfiche carriage and index holder 18 is supported on the base portion 14 and is mounted for movement with respect to the base portion. A lens assembly 20 is mounted in the hood 12 and disposed above the carriage 18.

MICROFICHE CARRIAGE

Figure 2:
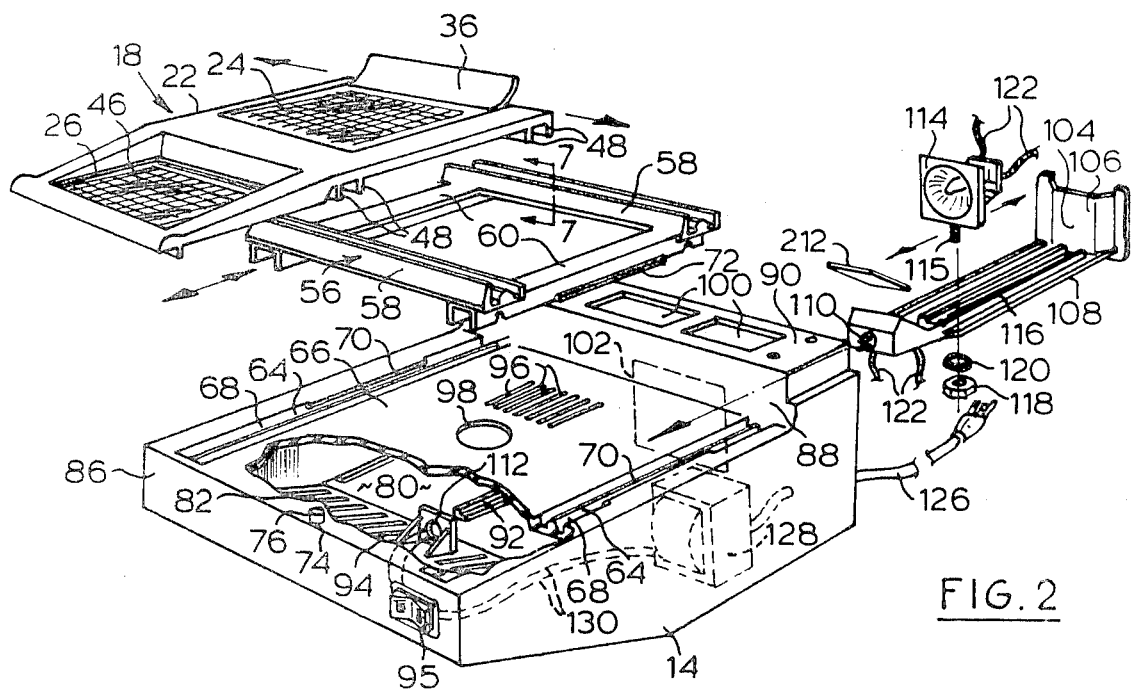
FIG. 2 is a top view of the platform of the microfiche reader and an exploded view of the microfiche carriage of FIG. 1.
Figure 8:
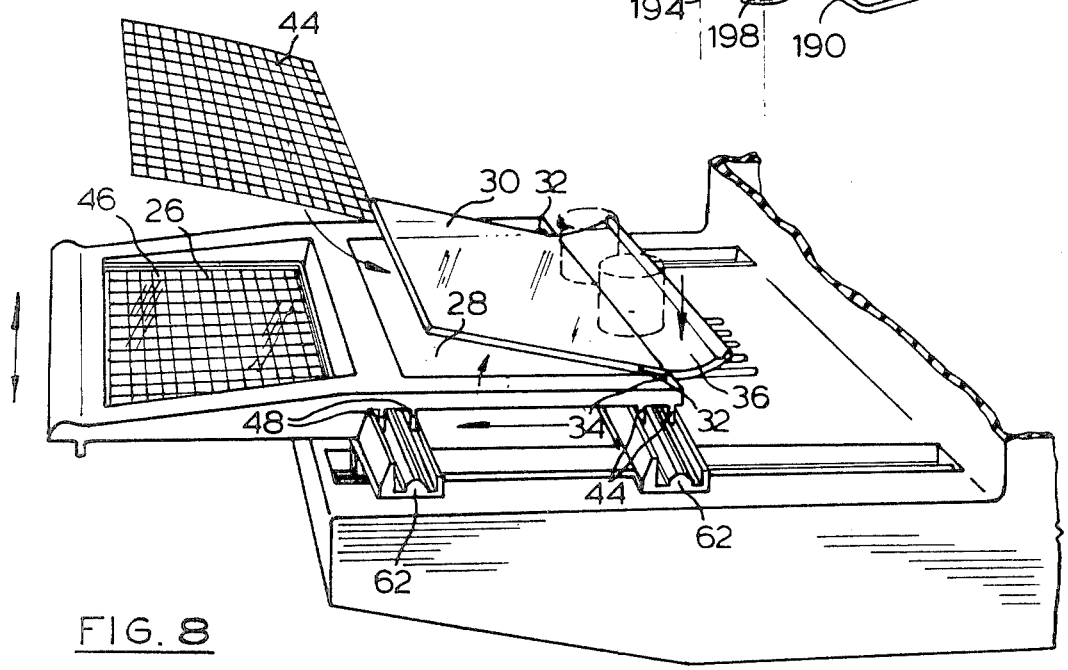
FIG. 8 is a pictorial side view of the microfiche carriage located on the support platform of the microfiche reader.
Figure 9:
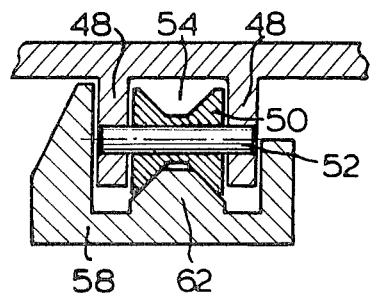
FIG. 9 is a sectional view through a support rail and the undercarriage illustrating the rail and wheel configuration.

The structure of the combined microfiche carriage and index holder 18 and its support structure is illustrated in FIGS. 2, 8 and 9 of the drawings. The combined microfiche carriage and index holder 18 consists of a frame 22 which has a first window 24 opening therethrough and a second window 26 opening therethrough. The lower glass flat 28 (FIG. 8) is located in the first window 24 and an upper glass flat holder 30 is pivotally mounted by means of lugs 32 in recesses 34. The lugs 32 form hinges about which the upper glass flat 30 may pivot so as to be raised out of engagement with the lower glass flat 28. An actuator extension 36 extends rearwardly and upwardly from the back edge of the upper glass flat holder. The actuator extension 36 engages the lug 38 located on the underside of the lens support plate 40 (FIG. 3) so that when the carriage 18 is moved outwardly towards the operator, the actuator extension will at a predetermined location cause the upper glass flat to pivot upwardly to facilitate the location of a microfiche 44 between the lower glass flat 28 and the upper glass flat 30. An index grid 46 is located in the second window 26. Two sets of ribs 48 extend across the underside of the carriage 18 in a spaced parallel relationship.

As shown in FIG. 9 of the drawings, a V-shaped wheel 50 is mounted for rotation on a shaft 52 which is supported by the ribs 48. A plurality of wheels 50 are located in this manner in a channel 54 formed between the ribs 48 at spaced intervals along the length of the ribs. A rectangular shaped undercarriage 56 is formed with a pair of support rails 58 extending transversely thereof and a pair of U-shaped channel members 60 extending longitudinally thereof. As shown in FIG. 9 of the drawings, each of the rail members 58 has a V-shaped rail portion 62 which is proportioned to support the V-shaped wheels 50. A plurality of additional wheel members 50 are located in the U-shaped channel members 60 at spaced intervals along the length thereof. Channels 64 are formed in the surface of the platform 66 of the base member 14. Support rails 68 of the same contour as the rails 62 extend longitudinally of the channels 64. A narrow lip portion 70 projects outwardly from an outer side edge of each channel 64. In use, the lip 70 overlies the ledge 72 which projects outwardly from the side of the U-shaped channel members 60 and serves to retain the undercarriage 56 in engagement with the rail member 58.

To mount the undercarriage 56 on the platform 64, it is located towards the front end of the platform and lowered to a position in which the wheel members 50 carried by the undercarriage rest on the support rails 64. The carriage 22 is mounted on the undercarriage 56 by locating the wheel members 50 on the guide rails 62. Longitudinal movement of the carriage 18 with respect to the reader is achieved by the movement of the undercarriage 56 along the support rails 68 and transverse movement is achieved by transverse movement of the carriage 26 with respect to the undercarriage 58 by the movement of the support wheels 50 along the guide rails 62.

Figure 2A:
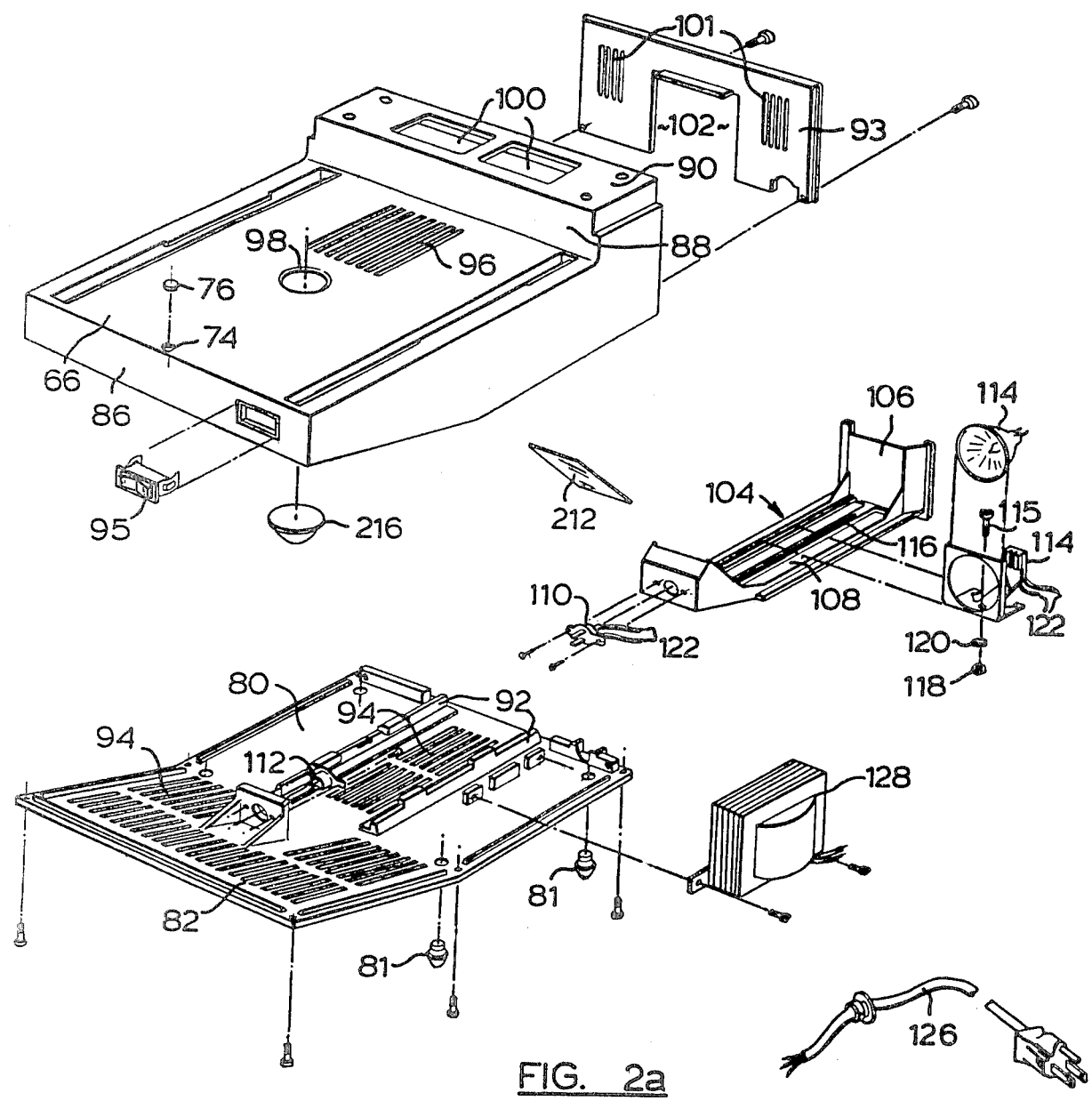
FIG. 2a is an exploded top view of the platform of the microfiche reader.

As shown in FIGS. 2 and 2a of the drawings, an index illuminating passage 74 opens through the wall of the platform 66 centrally of the width thereof. An index illuminating lens 76 is located in the passage 74 and serves to concentrate the light emitted through the passage 74. As will be described hereinafter, light emitted from the lens 76 passes through the indexing grid 46 and serves to provide a method of locating a required location on the microfiche by reference to the illuminated grid.

THE BASE MEMBER

The base member 14 has a bottom wall 80 (FIG. 2a) extending from the back face thereof towards the front face. An angularly inclined bottom wall 82 extends upwardly and forwardly from the bottom wall 80 to a front wall 86 which extends vertically upwardly to the platform 66. An inner wall 88 extends upwardly from the platform and a top wall 90 extends rearwardly from the inner wall 88 to the back wall 93. A pair of guide rails 92 are located on the inner face of the bottom wall 80. A plurality of vent openings 94 are located in the bottom wall 80 and in the inclined bottom wall 82. An operating switch 95 is mounted in the front wall 86. Vent passages 96 are located in the platform 66. A condenser passage 98 opens through the platform 66. Air circulation passages 100 and 101 open through the top wall 90 and back wall 93 respectively. A lamp mounting passage 102 opens through the back wall 93 of the base.

A removable drawer 104 is proportioned to extend through the passage 102 in the back wall so as to be located within the base 14 with the back plate 106 thereof closing the passage 102. The drawer 104 has a bottom wall 108, the opposite side edges of which are adapted to fit within the track formed by the guide rails 92. An electrical plug member 110 is located at the inner end of the drawer 104 and is adapted to fit within a socket 112 located in the base 14 when the drawer is located in an opposite position within the base. A prefocussed lamp 114 is adjustably mounted on the bottom wall 108 by means of a mounting bolt 115 which is threaded and which extends through a passage 116 in the bottom wall 108 and is clamped by means of a nut 118 and a spring washer 120.

The lamp 114 and its associated housing may be moved longitudinally of the bottom wall 108 to any required position. The lamp 114 is electrically connected to the plug member 110 by wires 122 such that when the drawer 104 is located in an operative position within the base, electrical power is supplied to the prefocussed lamp 14.

The electrical power is supplied to the microfiche reader as a whole by means of cable 126. The electrical power is supplied to the transformer 128 which is located in the housing and the transformer 128 is electrically connected to ON/OFF switch 95 by lines 130.

HOOD STRUCTURE

Figure 3:
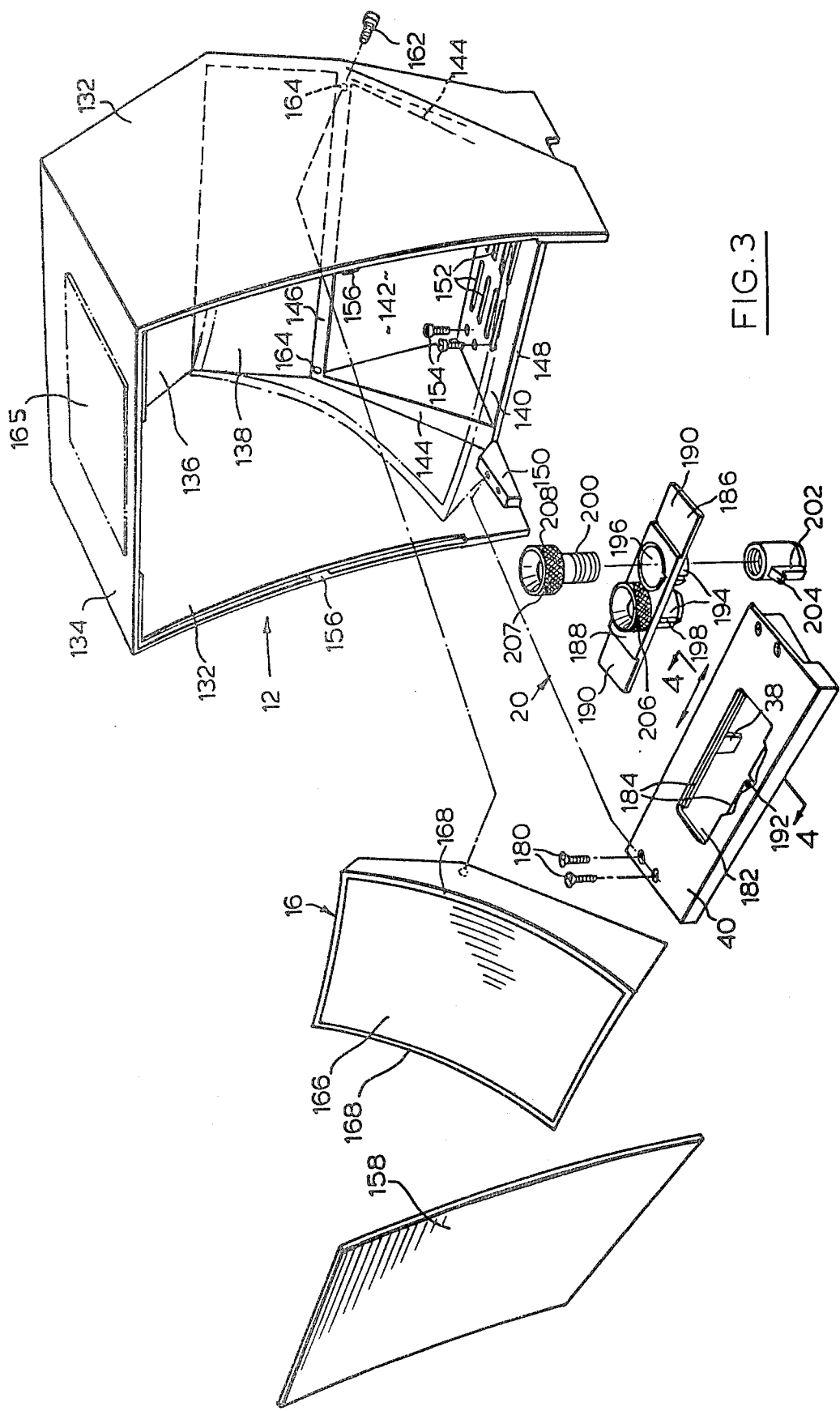
FIG. 3 is an exploded view of the hood portion of the microfiche reader of FIG. 1.

The structure of the hood 12 is illustrated in FIGS. 1 and 3 of the drawings. As shown in FIG. 3 of the drawings, the hood 12 has a pair of side walls 132, a top wall 134, an upper back wall 136, a lower back wall 138 and a bottom wall 140. A passage 142 opens between the lower back wall 138 and the bottom wall 140. A screen support shoulder is formed about the inner edge of the passage 142 and consists of side shoulder portions 144, top shoulder portion 146 and bottom shoulder portion 148. A pair of support lugs 150 (only one shown) are located at the lower edge of each side wall 132 and serve to support the lens support plate 40 as will be described hereinafter. The bottom wall 140 is formed with a plurality of air circulating vent passages 152. The hood 12 is mounted on the base 14 with the bottom wall 140 supported by the top wall 90 of the base. Mounting screws 154 secure the hood with respect to the base. A window mounting lip 156 is located at the front edge of the hood to secure a window 158 therein. The screen 16 has mounting passages 160 (FIG. 6) in the back face thereof which are threadably engaged by mounting screws 162 (FIG. 3) which extend through passages 164 formed in the upper screen mounting shoulder 146 to secure the screen with respect to the housing in the position shown in chain lines in FIG. 3. A highly reflective mirror 165 is mounted on the inner face of the top wall 134 of the hood to reflect images projected thereon onto the screen 16.

SCREEN

The screen 16 is made from a unitary body of molded plastics material such as A.B.S. The image receiving surface 166 of the screen has a concave spherical curvature. The side edges 168 of the screen converge with respect to one another in a direction towards the upper edge of the screen. It has been found that the configuration of the image receiving surface achieved by providing a concave curvature both longitudinally and transversely of the screen and by reducing the width of the screen towards the upper end is most suitable for receiving images projected by the projection system described hereinafter. The unitary body of the screen 16 includes side walls 170, top wall 172, bottom wall 174 and a pair of diagonally extending reinforcing webs 176. The inner edge of the side walls is shaped to follow the configuration of the hood in which it is mounted. The image receiving surface 166 of the screen is plated with a layer of silver or the like to form an image reflecting coating thereon.

LENS ASSEMBLY

Figure 4:
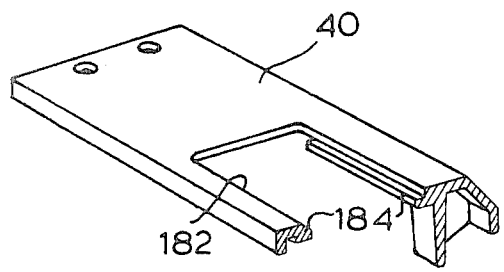
FIG. 4 is a sectioned pictorial view of the lens support plate.
Figure 5:
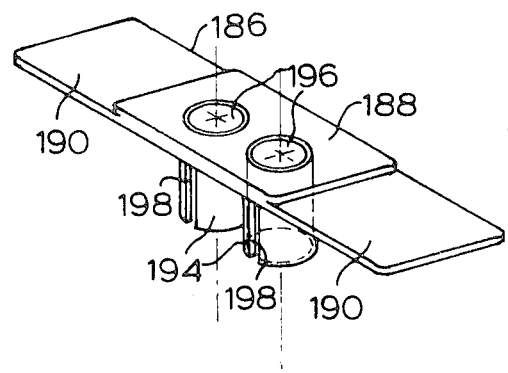
FIG. 5 is a pictorial view of the lens holder assembly.

The lens assembly 20 is illustrated in FIGS. 3, 4 and 5 of the drawings. The lens assembly 20 consists of a support plate 40 which is mounted on support lugs 150 of the hood 14 by means of mounting screws 180. The support plate 40 has a passage 182 opening therethrough. As shown in FIGS. 3 and 4 of the drawings, a support rail 184 is located below the side edges of the passage 182 in a spaced relationship with respect to the support plate 40. A slide member 186 has a central portion 188 which is substantially shorter in length than the passage 182. The slide member 186 also has a pair of end portions 190 which are thinner than the central portion 188. The slide member 186 is mounted in the support plate 40 and is supported therein by support rails 184. The central portion 188 of the slide member projects into the passage 182 and the end portions 190 underlie the support plate 40 at opposite ends of the passage 182. By reason of the fact that the central portion 188 is shorter than the passage 182, the slide member 186 may be moved back and forth in the passage 182. The front support rail 184 has a notch 192 opening therethrough which serves to operably locate the required objective lens in the projection path as will be described hereinafter. The slide member 186 has a pair of tubular sleeve projections 194 projecting downwardly therefrom. The sleeve projections 194 have passages 196 opening therethrough. A longitudinal slot 198 also opens through each sleeve projection at the front end thereof, a portion of the slot 198 also opening through the central portion 188 of the slide into the passage 196. A pair of lens holders 200 are adapted to fit within the passages 196. Each of the lens holders 200 has a key projection 202 extending longitudinally thereof. The key 202 has a lip portion 204 at the upper end thereof which projects outwardly from the main body. The main body of the key 202 is adapted to fit in a close fitting relationship within the slot 198 so that the lens holder member 200 may drop downwardly through the passage 196 when the key portion 202 is aligned with the notch 192 in the support rails 184 of the support plate 40. When the key 202 is cut of alignment with the notch 192, the lip portion 204 rides along the support rail 184 and holds the lens holder in a raised position. Objective lenses 206 and 207 are threadably mounted in the lens holders 200. The objective lenses 206 and 207 have a housing 208 which has a greater diameter than the diameter of the passage 196 in the slide member 186 so that the housings 208 limit the extent to which the lenses may drop relative to the slide member 186.

PROJECTION SYSTEM

The image projection system is illustrated in FIG. 7 of the drawings. As shown in FIG. 7 of the drawings, light emanating from the prefocussed lamp 114 travels along the path 210 and is reflected by a first cold mirror 212 which, as shown in FIG. 2 of the drawings, is mounted in the demountable drawer 104. The light is reflected by the mirror 212 along the path 214 to a condenser lens 216. The condenser lens 216 is mounted in the passage 98 formed in the platform 66 of the base 14. The light beam passes through the condenser lens 216 and is directed along the path 218 through a portion of the microfiche 44. The image carried by the microfiche 44 is projected through the objective lens 206 along the path 220 onto the first surface mirror 165. The image is reflected from the mirror 165 along the path 222 onto the image receiving surface 166 of the screen 16. The lamp 114 illuminates the interior of the base 14 and the light from within the base is emitted through the index illuminating lens 76 along the path 224 which projects through the index grid 46. By reason of the fact that the index grid 46 and microfiche 44 are mounted in the combined microfiche carriage and index holder 18 in a fixed relationship with respect to one another and the fact that the index illuminating beam of light travels along a path 224 which is located in a fixed relationship with respect to the path 218 of the microfiche illuminating light beam, it is possible to locate any required portion of the microfiche in the projection path by locating the corresponding portion of the index grid in the index illuminating path. The slide member 190 is movable so as to permit either one of the objective lenses 208 to be located in the path 218. In use, the objective lenses 208 may have different magnifications so that the magnification of the microfiche reader may be adjusted by the simple act of moving the slide 190 to and fro to align the required objective lens with the image projecting path 218. Similarly, the carriage 18 is movable relative to the condenser lens 216 in the direction of the X-axis and in the direction of the Y-axis shown in FIG. 7. This mobility of the carriage 18 permits any portion of the microfiche 44 and index grid 46 to be located in the paths 218 and 224 respectively so that any portion of the microfiche 46 may be projected onto the image receiving surface 166 of the screen 16.

OPERATION

Prior to operation of the microfiche reader, the required objective lenses are selected. The optical characteristics of the objective lenses may be such that it is necessary to adjust the position of the prefocussed lamp 114 with respect to the condense lens 216 in order to focus the beam emitted from the condenser lens 216 on the objective lens 207. As previously indicated, the prefocussed lamp 114 is adjustable with respect to the drawer 104. The position of the prefocussed lamp 114 is, therefore, adjusted by releasing the clamping nut 118 and moving the lamp 114 longitudinally of the bottom wall 108 of the drawer.

In order to locate the microfiche 44 in the microfiche holder 18, the microfiche holder 18 is moved in the direction of the X-axis (FIG. 7) until the upper glass flat 30 is elevated by engagement of the actuator lip 36 with the tongue 38 which projects downwardly from the support plate 40. The microfiche 44 is then located between the upper and lower glass flats 28 and 30 and the carriage 18 is moved inwardly, as a result of which the upper glass flat 30 is lowered into a face-to-face relationship with the microfiche 44.

As previously indicated, one of the objective lens members 208 is aligned with the path 218. The lens holder 200 of the aligned objective lens rests on the upper glass flat 32 while the lens holder of the non-aligned objective lens is held in a spaced relationship above the upper glass flat 32. When the lens holder 200 is aligned with the projection path, the key 202 and lug 204 are free to slide in the notch 192 in the support rails 184. By reason of the fact that the lower end of the aligned lens holder rests on the upper glass flat, the distance between the objective lens and the microfiche 44 is a constant and consequently the objective lens can be accurately located with respect to the microfiche and with respect to the image receiving surface 166 of the screen 16.

When the microfiche is operably located in the microfiche holder 18, as described above, the microfiche holder 18 may be moved to align any required portion of the index grid with respect to the index illuminating lens 74. The beam of light emitted through the illuminating lens 74 will illuminate the section of the grid corresponding to the portion of the microfiche which projected onto the screen. In this manner, any required portion of the microfiche may be projected onto the screen by reference to the illuminated section of the index grid.

SUMMARY

From the foregoing it will be apparent that the microfiche reader described above provides a number of improvements over the known structures. In one such improvement, the microfiche reader provides a combined microfiche carriage and index holder 18. By reason of the fact that both the microfiche 44 and the index grid 46 are mounted in a fixed relationship with respect to one another, it is easier to accurately locate the required section of the microfiche with respect to the illuminating path. In addition, the undercarriage support structure for the combined microfiche carrier and index holder is designed to provide free movement of the carriage 18 with respect to the projection path. The V-shaped profile of the guide rails and support wheels is such that there will be a minimum backlash in the guide track system. It will also be noted that by reason of the fact that the microfiche is retained in a stationary relationship with respect to the index grid, any backlash in the undercarriage support system does not contribute to any misalignment of the microfiche with respect to the grid as would be the case in a structure where the microfiche is moved relative to the grid. The fact that the upper glass flat is elevated automatically when the carriage 18 is moved to a predetermined forward position greatly facilitates the removal and placement of the microfiche between the upper and lower glass flats.

A further improvement is provided in the structure of the lens assembly in that the assembly provides two lens members, either one of which may be moved into the projection path as required. Furthermore, the lens assembly is designed to permit the objective lens holder to rest on the upper surface of the upper glass flat thereby positively locating the objective lens in a set position with respect to the microfiche.

A still further improvement provided by the microfiche reader of the preferred embodiment is in the structure of the projection system which includes a demountable modular unit 104 which supports a prefocussed lamp for movement thereon so that the lamp may be moved towards and away from the condenser lens whereby the optical system may be adjusted to accommodate objective lenses having different characteristics. This provides for a very simple adjustment of the optical system which is not available in existing microfiche reader devices.

A still further improvement provided by further features of the microfiche reader is in the projection system which includes a prefocussed lamp, a first cold mirror, an optical condenser, an objective lens, first surface mirror, and a viewing screen, all of which are mounted in series along the projection path. The viewing screen is formed from a unitary body of molded plastics material and has an image receiving surface formed with a concave spherical curvature. The concave spherical curvature of the image receiving surface provides for the minimum distortion of the projected image.

Yet another advantage of the structure of the microfiche reader of the preferred embodiment is in the fact that it is not necessary to provide a forced air cooling system in order to cool the projection system. The prefocussed lamp is preferably a ninety watt lamp. The base member is formed with a plurality of ventilating passages 94. The base member 14 is supported on feet 81 so that it is spaced above its support surface in use so that air may be admitted through all of the ventilating passages 94. The air passes upwardly through the base and a portion of the cooling air may be discharged from the base through ventilating passages 36 in the upper wall of the platform 66. The remaining portion of the cooled air, which is the major portion of the air, is discharged from the base through the passages 100 in the upper wall 90 to pass through the passages 152 in the bottom wall 140 of the hood and to be directed rearwardly from the hood through the passage 142 in the back wall of the hood and thus to atmosphere. It has been found that this air circulating system provides adequate cooling for a ninety watt rated prefocussed lamp 114. Furthermore, it has been found that this cooling system sufficiently cools the entire housing of the microfiche viewer to an extent that the viewer may be made entirely from an injection molded plastics material such as Merlon SF600 structured foam plastic. By reason of the fact that all of the various components of the viewer housing and carriage may be made from injection molded plastic material, the overall cost of production of the microfiche viewer can be minimized in a mass production process.

These and other advantages of the microfiche viewer of the present invention will be apparent to those skilled in the art.

What I claim as my invention is:

1. In a microfiche reader of the type having a housing, an image projection system in said housing and including projector means and a screen for receiving a projected image and an illuminating path extending from the projector means to the screen, the improvement of:
   (a) a combined microfiche carriage and index holder comprising:
      (i) a frame;
      (ii) a first window opening through said frame;

(iii) means for locating a microfiche in a predetermined position with respect to said first window for the projection of light therethrough;

(iv) a second window opening through said frame;

(v) a transparent index grid mounted in said second window in a predetermined position with respect to said second window for the projection of light therethrough;

(b) index illuminating means supported by the housing and underlying said second window and located in a fixed relationship with respect to a portion of the illuminating path which projects from the housing through said first window opening;

(c) first and second guide rail means carried by said housing and said frame and supporting said frame for planar movement with respect to said housing to locate any required area of the grid in the beam of light emanating from the index illuminating means and thereby to locate the corresponding areas of the microfiche in the illuminating path of the projector for projection onto the screen, (d) said housing including a base portion having a generally horizontally extending support surface, said platform having a front end and a back end, said index illuminating means being located adjacent said front end of said platform and said illuminating path extending through said platform at a location spaced rearwardly from said index illuminating means with respect to said front end whereby said second window opening of said microfiche carriage is located forwardly of said first window with respect to the front end of said platform to be readily visible, (e) said first guide rail means being located on said platform and extending longitudinally from said front end of said platform, an undercarriage having first wheel means mounted thereon and engaging said first guide rail means for movement therealong, said second guide rail means being located on said undercarriage and extending normal to said first guide rail means, second wheel means on said frame engaging said second guide rail means for movement therealong, said first and second guide rail means having a V-shaped support surface and said first and second wheel means having a V-shaped surface adapted to outwardly overlie said V-shaped support surface of said first and second guide rail means, said first and second wheel means being mounted to rotate about horizontally oriented axes whereby both faces of the V-shaped support surfaces support the weight of the carriage in use, said first guide rail means being recessed below the platform and the platform being provided with slot means through which the first wheel means of the undercarriage extend to engage the first guide rail means, the slot means being widened above the position of the first wheel means when the undercarriage is pulled all the way forward with respect to the platform in which position the undercarriage can be lifted from the first guide rail means, and the slot means being narrowed along the remainder of its length to partially overlie the first wheel means to retain them engaged with the first guide rail means.

* * * * *